US009569572B2

(12) United States Patent
Shupe (10) Patent No.: US 9,569,572 B2
(45) Date of Patent: Feb. 14, 2017

(54) SELECTIVELY LOADING DESIGN DATA FOR LOGICAL EQUIVALENCY CHECK

(71) Applicant: Mentor Graphics Corporation, Wilsonville, OR (US)

(72) Inventor: Paul Shupe, Longmont, CO (US)

(73) Assignee: Mentor Graphics Corporation, Wilsonville, OR (US)

(*) Notice: Subject to any disclaimer, the term of this patent is extended or adjusted under 35 U.S.C. 154(b) by 0 days.

(21) Appl. No.: 14/705,699

(22) Filed: May 6, 2015

(65) Prior Publication Data

US 2016/0328506 A1 Nov. 10, 2016

(51) Int. Cl.
*G06F 17/50* (2006.01)

(52) U.S. Cl.
CPC .................. *G06F 17/5045* (2013.01)

(58) Field of Classification Search
CPC ....................................... G06F 17/50
USPC ......................................................... 716/107
See application file for complete search history.

(56) References Cited

U.S. PATENT DOCUMENTS

2005/0193280 A1* 9/2005 Schubert .......... G01R 31/31704
714/47.1

\* cited by examiner

*Primary Examiner* — Thuan Do
(74) *Attorney, Agent, or Firm* — Mentor Graphics Corporation

(57) ABSTRACT

This application discloses a system implementing tools and mechanisms to selectively load design data for logical equivalency check. The tools and mechanisms can identify a hierarchy of modules in a circuit design, perform a depth-first search of the hierarchy of modules starting with a root module to identify a subset of modules to parse, and selectively parse the subset of the modules in the circuit design. The tools and mechanisms can utilize the parsed subset of the modules to determine logical equivalence of the circuit design with at least another circuit design.

20 Claims, 5 Drawing Sheets

SELECTIVELY LOADING DESIGN DATA FOR LOGICAL EQUIVALENCY CHECK

TECHNICAL FIELD

This application is generally related to electronic design automation and, more specifically, to techniques for selectively loading design data for logical equivalency check.

BACKGROUND

Designing and fabricating electronic devices typically involves many steps, known as a "design flow." The particular steps of a design flow often are dependent upon the type of circuitry, its complexity, the design team, and the device fabricator or foundry that will manufacture the electronic device. Several steps are common to most design flows for electronic devices. Initially, a specification for a new circuit is transformed into a logical design, sometimes referred to as a register transfer level (RTL) description of the circuit. With this logical design, the circuit can be described in terms of both the exchange of signals between hardware registers and the logical operations that can be performed on those signals. The logical design typically employs a Hardware Design Language (HDL), such as Verilog, Very high speed integrated circuit Hardware Design Language (VHDL), or the like.

At various stages of the design flow, the design is transformed into a different representation, for example, the transformation of the design from an RTL representation to a gate-level netlist representation during synthesis, the transformation of the gate-level netlist to a physical design layout, or the like. These transformations are intended to convert the design into an equivalent representation, albeit at a different level of abstraction than the previous representation of the design, which retains the functionality of the design. To help ensure that a transformation did not alter the functionality of the design, an equivalence of the different design representations can be determined, for example, using a logical equivalence tool that often include one or more formal techniques, such as a Binary Decision Diagram (BDD), a Boolean Satisfiability (SAT) Solver, an Automatic Test Pattern Generator (ATPG), Cut Point Prover, or the like.

While the use of the logical equivalence tool can be an effective way to determine logical equivalence between multiple designs at different levels of abstraction, it often takes a non-insignificant amount of time to load the multiple designs into the logical equivalence tool. Typically, the logical equivalence tool will parse the entirety of each design, identify which portions of each design correlate to each other, and link those correlated portions together in a data structure. After the data structure has been built, the logical equivalence tool can attempt to determine logical equivalence between the correlated portions based on the data structure.

Oftentimes, designers wish to utilize the logical equivalence tools to check only a subset of the designs for logical equivalence, but these logical equivalence tools still have to perform the time-consuming operation of loading the entirety of each design before checking the subset of the designs. Some synthesis tools have attempted to truncate this initial loading burden by generating one or more additional design files that include portions of the designs that the logical equivalence tools wish to check for logical equivalence. The logical equivalence tools can then load the entirety of these newly generated design files and check them for equivalence. The assumption, however, that an equivalence between the newly generated design files necessarily renders equivalent the portions of the designs included in the newly generated design files can be fallacious, as the generation of the design files is often susceptible to errors. In other words, when a conventional logical equivalence tool wishes to check only a subset of multiple designs, there is a tradeoff between load time and accuracy.

SUMMARY

This application discloses a system implementing tools and mechanisms to selectively load design data for logical equivalency check. The tools and mechanisms can identify a hierarchy of modules in a circuit design, perform a depth-first search of the hierarchy of modules starting with a root module to identify a subset of modules to parse, and selectively parse the subset of the modules in the circuit design. The tools and mechanisms can utilize the parsed subset of the modules to determine logical equivalence of the circuit design with at least another circuit design. Embodiments will be described below in greater detail.

DETAILED DESCRIPTION

Illustrative Operating Environment

The execution of various electronic design automation processes according to embodiments of the invention may be implemented using computer-executable software instructions executed by one or more programmable computing devices. Because these embodiments of the invention may be implemented using software instructions, the components and operation of a programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads.

Figure 1:
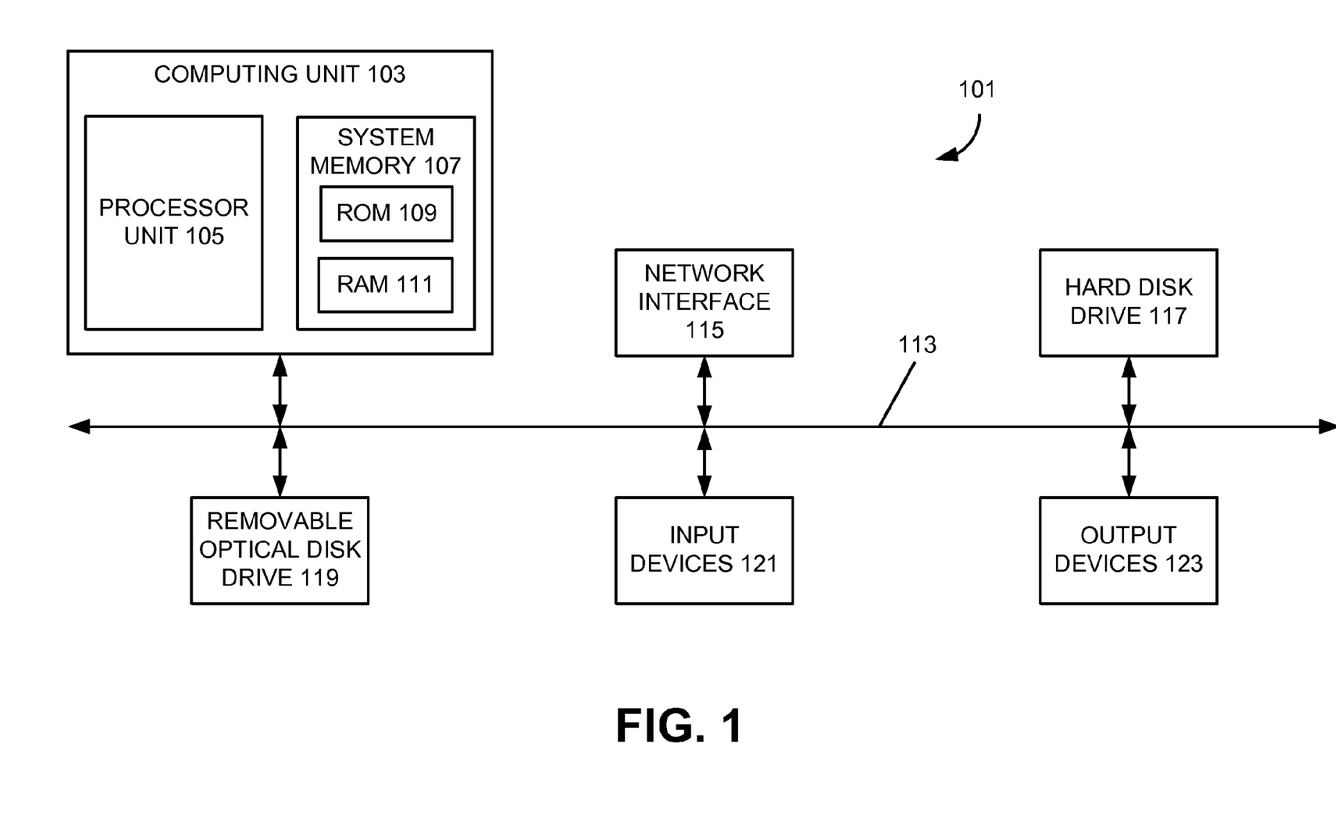
FIGS. 1 and 2 illustrate an example of a computer system of the type that may be used to implement various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
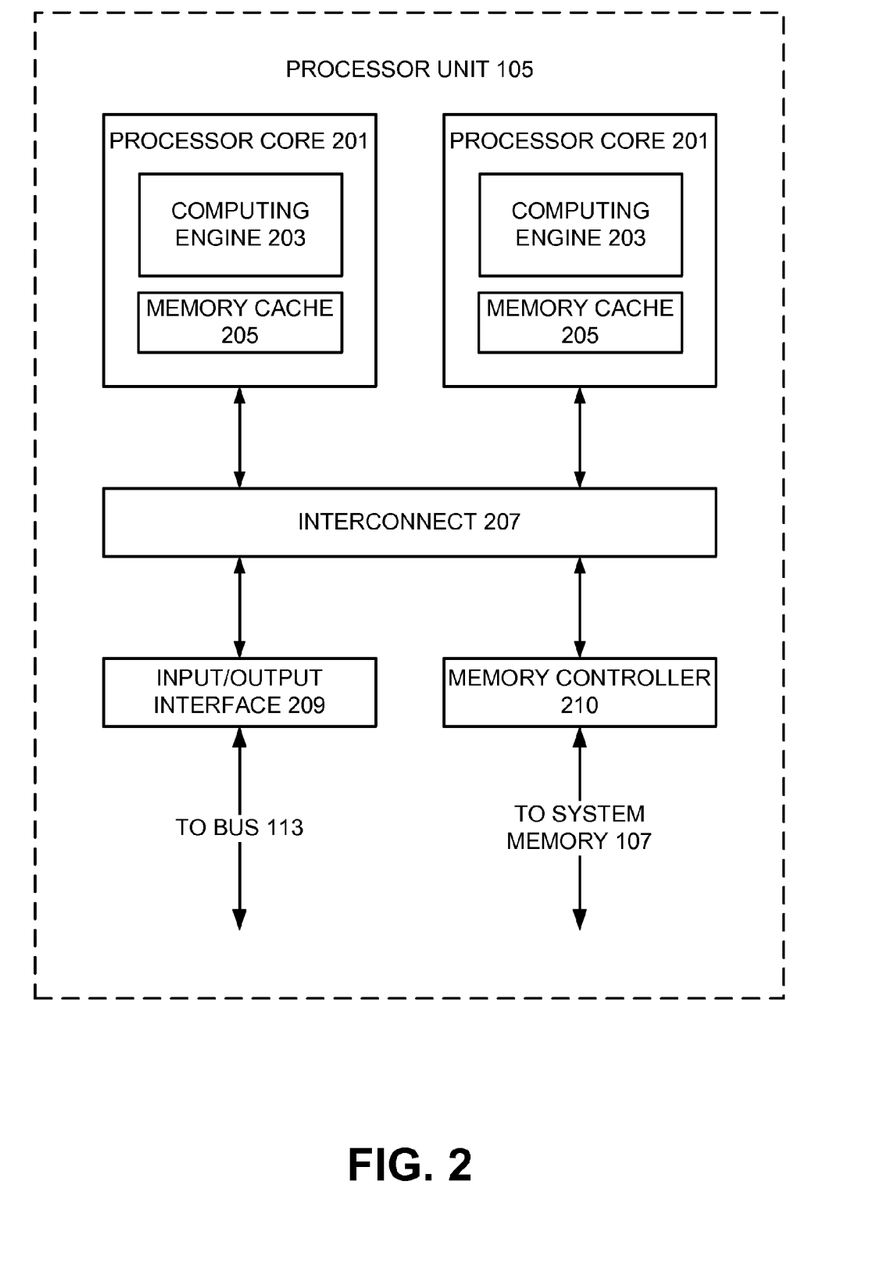

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 113. Similarly, the memory controller 211 controls the exchange of information between the processor unit 201 and the system memory 107. With some implementations of the invention, the processor units 201 may include additional components, such as a high-level cache memory accessible shared by the processor cores 201.

It also should be appreciated that the description of the computer network illustrated in FIG. 1 and FIG. 2 is provided as an example only, and it not intended to suggest any limitation as to the scope of use or functionality of alternate embodiments of the invention.

Selectively Loading Design Data for a Logical Equivalence Check

Figure 3:
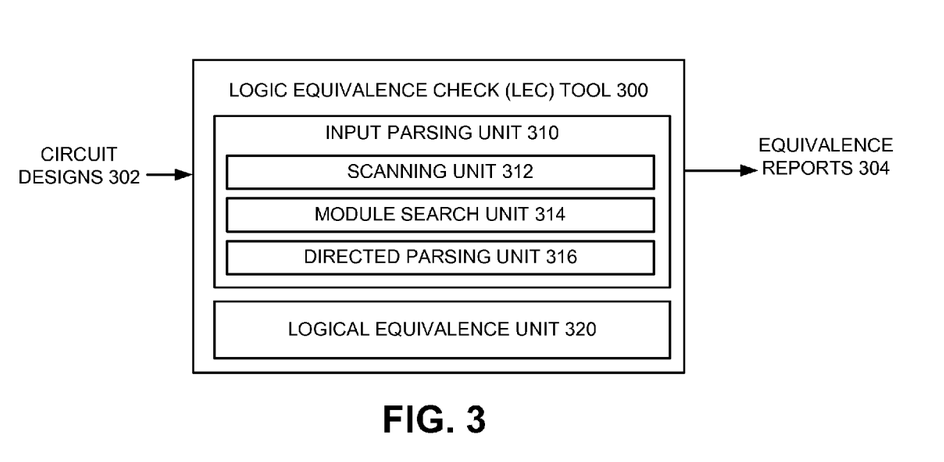
FIG. 3 illustrates an example logic equivalence check (LEC) tool capable of determining equivalence of multiple circuit designs according to various embodiments of the invention.

FIG. 3 illustrates an example logic equivalence check (LEC) tool 300 capable of determining equivalence of multiple circuit designs 302 according to various embodiments of the invention. Referring to FIG. 3, the logic equivalence check tool 300 can receive the multiple circuit designs 302, which in some cases can be different representations of a common design of an electronic system, for example, at different levels of abstraction, such as a register transfer level (RTL) representation, a gate-level netlist representation, a physical design layout representation, or the like. In some embodiments, each of the circuit designs 302 can be included in at least one design file, such as a hardware description language (HDL) text file, a circuit design file, or the like, which in some instances can have unindexed design information of the electronic system. The logic equivalence check tool 300 can perform a formal equivalence check on combinational logic in the multiple circuit designs 302 and generate an equivalence report 304 that can indicate whether portions of the multiple circuit designs 302 are equivalent.

The logic equivalence check tool 300 can include an input parsing unit 310 to selectively parse the multiple circuit designs 302 and generate one or more design data files having a format that can allow the logic equivalence check tool 300 to perform a formal equivalence check on the multiple circuit designs 302. In some embodiments, the one or more design data files, sometimes called a design database, can include modules or portions of code that represent components (or portions thereof) selectively parsed from the multiple circuit designs 302 by the input parsing unit 310, leaving other modules in the multiple circuit designs 302 unparsed and not included in the one or more data design files.

To selectively parse the multiple circuit designs 302, the input parsing unit 310 can include a scanning unit 312, a module search unit 314, and a directed parsing unit 316. The scanning unit 312 can perform a high-level examination of the multiple circuit designs 302, for example, locating modules in the multiple circuit designs 302 and identifying any references to other modules within the located modules. In some embodiments, the scanning unit 312 also can identify compiler directives in the multiple circuit designs 302, such as an include command, a define command, or the like.

The scanning unit 312 can utilize the information gleaned from the high-level examination of the multiple circuit designs 302 to generate a hierarchy for each of the multiple circuit designs 302. In some embodiments, a hierarchy can include the modules identified in one of the circuit designs 302 and can link the modules according the references identified by the scanning unit 312.

The module search unit 314 can receive one or more root modules, which the input parsing unit 310 intends to parse from the circuit designs 302. The module search unit 314 can utilize these one or more root modules and the hierarchy of modules generated by the scanning unit 312 to identify subsets of modules in the circuit designs 302 for the parsing unit 310 to parse from the circuit designs 302. The subsets of modules, in some embodiments, can include the one or more root modules received by the module search unit 314 as well as those modules in the circuit designs 302 linked—directly or indirectly—to the one or more root modules. In some embodiments, the module search unit 314 can perform a depth-first search of the hierarchy of modules, utilizing the one or more root modules as starting points for each iteration of the depth-first search. Depth-first search can be implemented by a computing system, which traverses or searches a hierarchical tree or other graph data structures, for example, by starting at one of the root modules and exploring as far as possible along each branch of the hierarchical tree before backtracking.

The directed parsing unit 316 can selectively parse the circuit designs 302, for example, by parsing the subset of modules identified by the module search unit 314 from the circuit designs 302. The directed parsing unit 316 can generate a data structure from the parsed modules, which can include information corresponding to the modules that were parsed as well as links between the parsed modules. The data structure also can link the parsed modules from one of the circuit designs 302 to corresponding modules in a different one of the circuit designs 302. The directed parsing unit 316 can elect to leave the other modules in the circuit design 302 unparsed, which can speed-up the overall process to generate the data structure and ultimately the time it takes to perform a logical equivalence check on the circuit designs 302.

The logic equivalence check tool 300 can include a logical equivalence checking unit 320 to compare the portions of the multiple circuit designs 302 that were parsed by the input parsing unit 310, for example, in the data structure generated by the input parsing unit 310. The combinational equivalence checking unit 320 can identify portions of the combinational logic from the circuit designs 302 to analyze for equivalence to each other, for example, using formal techniques provided by a Binary Decision Diagram (BDD) tool, a Boolean Satisfiability (SAT) Solver tool, an Automatic Test Pattern Generator (ATPG) tool, Cut Point Prover tool, or the like. When the analysis of the portions of the combinational logic indicates that they are equivalent, the logical equivalence checking unit 320 can record their equivalence and proceed to analyzing different portions of the combinational logic from the circuit designs 302. In some embodiments, the different portions of the combinational logic from the circuit designs 302 can be sequentially following the previously analyzed portions of the combinational logic from the circuit designs 302. In other embodiments, the logical equivalence checking unit 320 can perform parallel equivalence checking on the combinational logic in the circuit designs 302. For example, the logical equivalence checking unit 320 can divide the combinational logic into multiple portions, and the equivalence checking on the portions of the combinational logic can be performed in parallel, for example, on different processing cores.

In some embodiments, the logical equivalence checking unit 320 can generate the equivalence report 304 based on its analysis of the portions of the multiple circuit designs 302 that were parsed by the input parsing unit 310. When the equivalence report 304 indicates the combinational logic is not equivalent between the multiple circuit designs 302, the equivalence report 304 can identify which portions of the combinational logic are not equivalent between the multiple circuit designs 302. The equivalence report 304 also can indicate whether one or more registers in one of the circuit designs 302 is unmatched to registers in another one of the circuit designs 302. The equivalence report 304 also can indicate a presence of a floating net in either of the circuit designs 302.

Figure 4A:
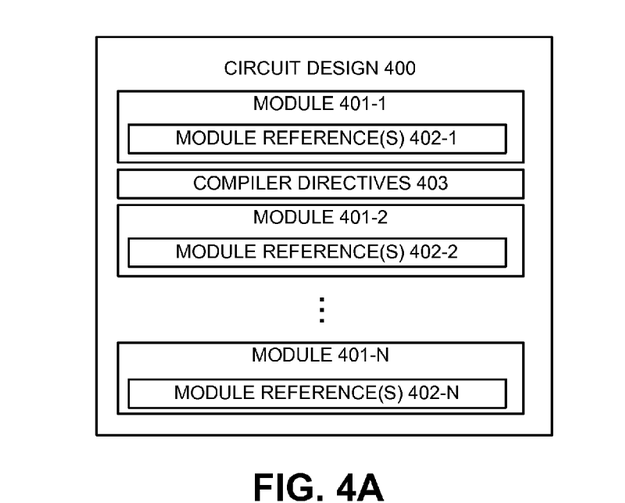
FIGS. 4A and 4B illustrate an example circuit design format and input parsing unit capable of selectively parsing the circuit design according to various embodiments of the invention.
Figure 4B:
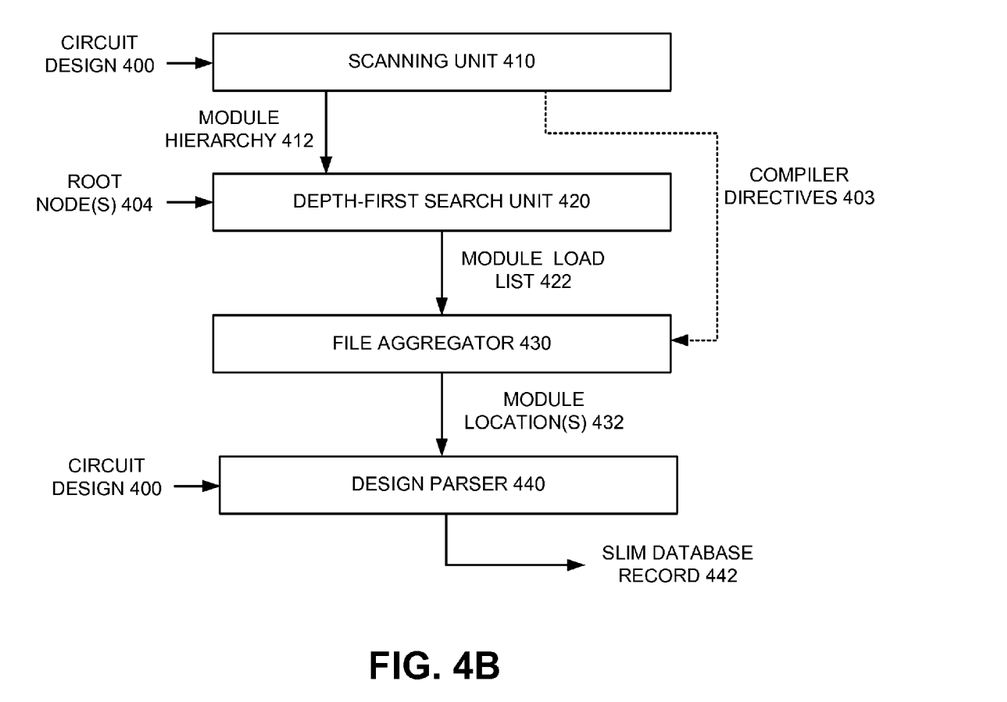

FIGS. 4A and 4B illustrate an example circuit design format and an input parsing unit capable of selectively parsing the circuit design according to various embodiments of the invention. Referring to FIG. 4A, a circuit design 400 can describe or model an electronic system at a specific level of abstraction, which could be at a register transfer level (RTL) representation, at a gate-level netlist representation, at a physical design layout representation, or the like. The circuit design 400 can include multiple different modules 401-1 to 401-N, each of which can describe a different portion, component, system, subsystem, or the like, of the electronic system.

The modules 401-1 to 401-N can include module reference(s) 402-1 to 402-N, respectively. The module reference(s) 402-1 to 402-N can identify which other module or modules in the circuit design 400, if any, are linked to the module 401 that includes the module reference 402. For example, if module 401-1 included a module reference 402-1 that identified module 401-2, the module 401-1 would link to module 401-2. In some embodiments, this link between module 401-1 and module 401-2 can indicate an instantiation of the module 401-2 is included within module 401-1 at the location of the module reference 402-1.

The circuit design 400 also can include compiler directives 403, which, for example, can be interleaved between various modules in the circuit design. In the instant example, the compiler directives 403 is located between modules 401-1 and 401-2, but in other embodiments, can be located in other portions of the circuit design 400. The compiler directives can include various commands directed to a compiler of the circuit design 400, such as an include command, a define command, or the like. The include command can identify a design file external to the circuit design 400 and, when the include command is executed during compilation of the circuit design 400, can cause the compiler to insert or point to the external design file in the compiled circuit design 400. The define command can identify various objects within the circuit design 400. For example, when the define command corresponds to a cell, the compiler can group code located between the start of the define command and when it ends as a cell of the electronic system.

Referring to FIG. 4B, the input parsing unit can selectively parse the circuit design 400 and generate design database record 442 having a format that can allow a logic equivalence check tool to perform a formal equivalence check on the circuit design 400. The input parsing unit can include a scanning unit 410 to analyze of the circuit design 40, for example, locating the modules 401-1 to 401-N in the circuit design 400 and identifying any module references 402-1 to 402-N within the modules 401-1 to 401-N. In some embodiments, the scanning unit 410 also can identify the compiler directives 403 in the circuit design 400, such as an include command, a define command, or the like. The scanning unit 410 can generate a module hierarchy 412, which includes the modules 401-1 to 401-N located in the circuit design 400 and links between those modules determined based on the module references 402-1 to 402-N located within the modules 401-1 to 401-N.

The input parsing unit can include a depth-first search unit 420 to receive a root module 404. The depth-first search unit 420 can utilize the root module 404 and the module hierarchy 412 generated by the scanning unit 410 to identify a subset of the modules 401-1 to 401-N in the circuit design 400, also known as a module load list 422. The subset of modules 401-1 to 401-N, in some embodiments, can include the root module 404 and those modules 401-1 to 401-N in the circuit design 400 linked—directly or indirectly—to the root module 404 via module references 402-1 to 402-N. The depth-first search unit 420 can identify the subset of the modules 401-1 to 401-N by performing a depth-first search on the module hierarchy 412, for example, by traversing the module hierarchy 412—starting at the root module 404—and exploring as far as possible along each branch of the module hierarchy 412 before backtracking.

The input parsing unit can include a file aggregator unit 430 to receive the module load list 422 from the depth-first search unit 420. The file aggregator unit 430 can utilize the module load list 422 to identify module locations 432, which can be positions or lines in the circuit design 400, so the input parsing unit can parse the modules in the module load list 422. When the circuit design 400 is stored on multiple different design files, the file aggregator unit 430 can identify a list of design files to access and the corresponding module locations 432 in those design files so the input parsing unit can parse the modules in the module load list 422.

The file aggregator unit 430 also can receive the compiler directives 403 from the scanning unit 410. The file aggregator unit 430 can utilize the compiler directives 403 to augment the module locations 432 in the circuit design 400 or corresponding design files to parse. For example, an include command can point to a different design file to be included in the compiled circuit design 400. When that different design file includes a module referenced in the circuit design 400, the file aggregator unit 430 can identify module locations 432 in the different design file to parse.

The input parsing unit can include a design parser 440 to selectively parse the circuit design 400, for example, according to the module locations 432 from the file aggregator unit 430. The design parser 440 can generate the design database record 442 from the parsed modules, which can include information corresponding to the modules that were parsed as well as links between the parsed modules. The design database record 442 also can link the parsed modules to corresponding modules in a different circuit design. The design database record 442 can elect to leave the other modules in the circuit design 400 unparsed, which can speed-up the overall process to generate the data structure and ultimately the time it takes to perform a logical equivalence check on the circuit design.

Figure 5:
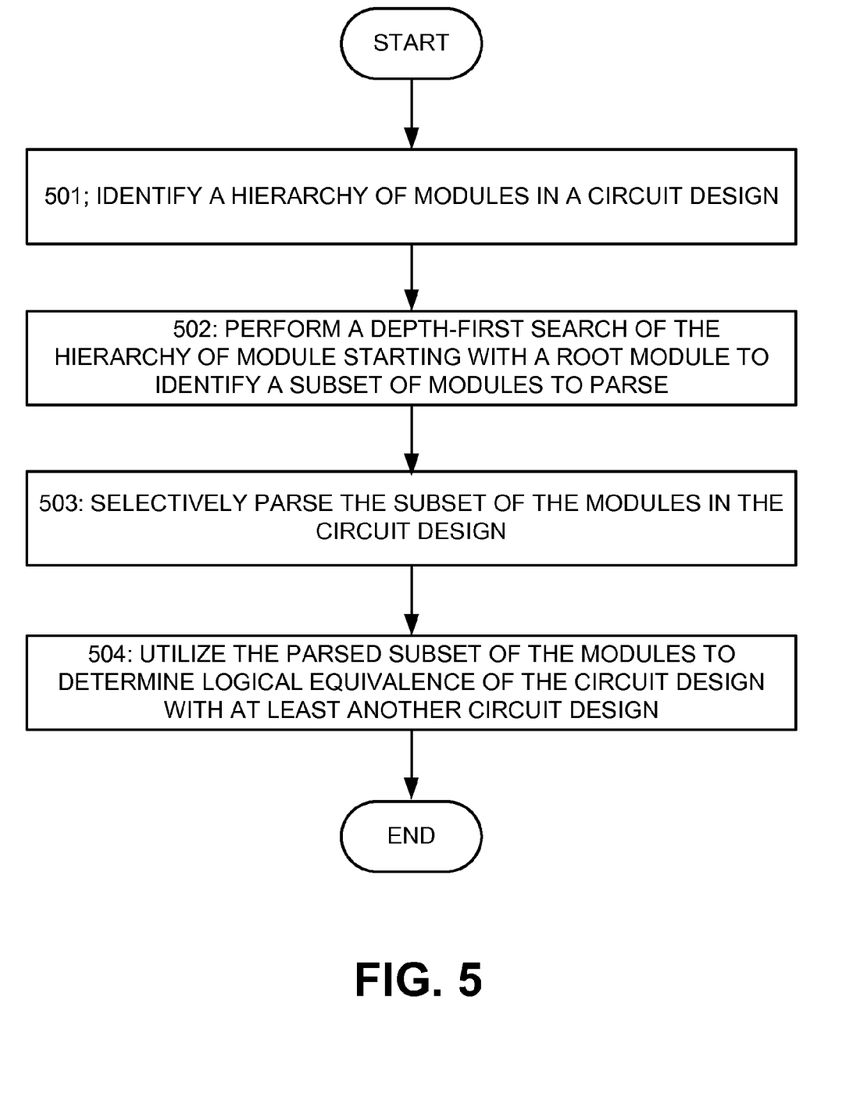
FIG. 5 illustrates a flowchart showing an example implementation of selective parsing of a circuit design for a logical equivalency check according to various embodiments of the invention.

FIG. 5 illustrates a flowchart showing an example implementation of selective parsing of a circuit design for a logical equivalency check according to various embodiments of the invention. Referring to FIG. 5, in a block 501, a computing system can identify a hierarchy of modules in a circuit design. In some embodiments, the computing system can perform a high-level examination of the circuit design, for example, locating modules in the circuit design and identifying any references to other modules within the located modules. In some embodiments, the computing system also can identify compiler directives in the circuit design, such as an include command, a define command, or the like, which can guide the identification of modules for the computing system to parse from the circuit design. The computing system can utilize the information gleaned from the high-level examination of the circuit design to generate the hierarchy for each of the circuit design. In some embodiments, the hierarchy can include the modules identified in the circuit design and can link the modules according the references.

In a block 502, the computing system can perform a depth-first search of the hierarchy of module starting with a root module to identify a subset of modules to parse. The depth-first search can traverse or search a hierarchical tree or other graph data structures, for example, by starting at the root modules in the hierarchical tree and exploring as far as possible along each branch of the hierarchical tree before backtracking. The subset of modules, in some embodiments, can include the root module as well as those modules in the circuit design linked—directly or indirectly—to the root module.

In a block 503, the computing system can selectively parse the subset of the modules in the circuit design. The computing system can generate a data structure from the parsed modules, which can include information corresponding to the modules that were parsed as well as links between the parsed modules. The data structure can also link the parse portions of the circuit design to portions of at least another circuit design to be checked for equivalence. The computing system can elect to leave the other modules in the circuit design unparsed, which can speed-up the overall process to generate the data structure and ultimately the time it takes to perform a logical equivalence check on the circuit designs.

In a block 504, the computing system can utilize the parsed subset of the modules to determine logical equivalence of the circuit design with at least another circuit design. The computing system can compare the parsed portions of the circuit design, for example, in the data structure, with parsed portions of the other circuit design to determine whether those parsed portions are logically equivalent to each other. In some examples, the computing system can utilize formal techniques to determine equivalence, such as those provided by a Binary Decision Diagram (BDD) tool, a Boolean Satisfiability (SAT) Solver tool, an Automatic Test Pattern Generator (ATPG) tool, Cut Point Prover tool, or the like. When the analysis of the portions of combinational logic indicates that they are equivalent, the computing can record their equivalence and proceed to analyzing different portions of the combinational logic from the circuit designs.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   generating, by a computing system, a module hierarchy for modules in a circuit design;
   selectively parsing, by the computing system, a subset of the modules in the circuit design based, at least in part, on the generated module hierarchy for the modules in the circuit design; and
   utilizing, by the computing system, the parsed subset of the modules to determine logical equivalence of the circuit design with at least another circuit design.

2. The method of claim 1, wherein generating the module hierarchy further comprises:
   scanning the modules in the circuit design to identify one or more references in the modules, wherein each reference is configured to identify another one of the modules that connected to the module including the reference; and
   building the module hierarchy by selectively linking the modules according to the references including in at least one of the modules.

3. The method of claim 1, further comprising:
   determining, by the computing system, a root module corresponding to a portion of the circuit design to check for logical equivalence; and
   utilizing, by the computing system, the module hierarchy to identify any modules linked to the root module, wherein the subset of modules includes the root module and the identified modules linked to the root module.

4. The method of claim 1, further comprising determining, by the computing system, locations of the subset of the modules in the circuit design, wherein the selective parsing of the subset of the modules in the circuit design is performed based on the identified locations of the subset of the modules in the circuit design.

5. The method of claim 1, wherein selectively parsing the subset of the modules in the circuit design further comprises building a data structure including a parsed representation of the modules in the circuit design and one or more links between the modules.

6. The method of claim 1, further comprising generating, by the computing system, at least one report configured to indicate any differences in the logical equivalence of the circuit design and the at least another circuit design, to indicate whether one or more registers in the circuit design are unmatched to registers in the at least another circuit design, or to indicate a presences of a floating net in either of the circuit design or the at least another circuit design.

7. The method of claim 1, wherein the circuit design is at least one of a design specified at a register transfer level in a hardware description language or a synthesized gate-level netlist.

8. A system comprising:
a memory system configured to store computer-executable instructions; and
a computing system, in response to execution of the computer-executable instructions, is configured to:
generate a module hierarchy for modules in a circuit design;
selectively parse a subset of the modules in the circuit design based, at least in part, on the generated module hierarchy for the modules in the circuit design; and
utilize the parsed subset of the modules to determine logical equivalence of the circuit design with at least another circuit design.

9. The system of claim 8, wherein the computing system, in response to execution of the computer-executable instructions, is further configured to:
scan the modules in the circuit design to identify one or more references in the modules, wherein each reference is configured to identify another one of the modules that connected to the module including the reference; and
build the module hierarchy by selectively linking the modules according to the references including in at least one of the modules.

10. The system of claim 8, wherein the computing system, in response to execution of the computer-executable instructions, is further configured to:
determine a root module corresponding to a portion of the circuit design to check for logical equivalence; and
utilize the module hierarchy to identify any modules linked to the root module, wherein the subset of modules includes the root module and the identified modules linked to the root module.

11. The system of claim 8, wherein the computing system, in response to execution of the computer-executable instructions, is further configured to:
determine locations of the subset of the modules in the circuit design; and
selectively parse of the subset of the modules in the circuit design is performed based on the identified locations of the subset of the modules in the circuit design.

12. The system of claim 8, wherein the computing system, in response to execution of the computer-executable instructions, is further configured to build a data structure including a parsed representation of the modules in the circuit design and one or more links between the modules.

13. The system of claim 8, wherein the computing system, in response to execution of the computer-executable instructions, is further configured to generate at least one report configured to indicate any differences in the logical equivalence of the circuit design and the at least another circuit design, to indicate whether one or more registers in the circuit design are unmatched to registers in the at least another circuit design, or to indicate a presences of a floating net in either of the circuit design or the at least another circuit design.

14. An apparatus comprising at least one computer-readable memory device storing instructions configured to cause one or more processing devices to perform operations comprising:
generating a module hierarchy for modules in a circuit design;
selectively parsing a subset of the modules in the circuit design based, at least in part, on the generated module hierarchy for the modules in the circuit design; and
utilizing the parsed subset of the modules to determine logical equivalence of the circuit design with at least another circuit design.

15. The apparatus of claim 14, wherein the instructions are configured to cause the one or more processing devices to perform operations further comprising:
scanning the modules in the circuit design to identify one or more references in the modules, wherein each reference is configured to identify another one of the modules that connected to the module including the reference; and
building the module hierarchy by selectively linking the modules according to the references including in at least one of the modules.

16. The apparatus of claim 14, wherein the instructions are configured to cause the one or more processing devices to perform operations further comprising:
determining a root module corresponding to a portion of the circuit design to check for logical equivalence; and
utilizing the module hierarchy to identify any modules linked to the root module, wherein the subset of modules includes the root module and the identified modules linked to the root module.

17. The apparatus of claim 14, wherein the instructions are configured to cause the one or more processing devices to perform operations further comprising determining locations of the subset of the modules in the circuit design, wherein the selective parsing of the subset of the modules in the circuit design is performed based on the identified locations of the subset of the modules in the circuit design.

18. The apparatus of claim 14, wherein selectively parsing the subset of the modules in the circuit design further comprises building a data structure including a parsed representation of the modules in the circuit design and one or more links between the modules.

19. The apparatus of claim 14, wherein the instructions are configured to cause the one or more processing devices to perform operations further comprising generating at least one report configured to indicate any differences in the logical equivalence of the circuit design and the at least another circuit design, to indicate whether one or more registers in the circuit design are unmatched to registers in the at least another circuit design, or to indicate a presences of a floating net in either of the circuit design or the at least another circuit design.

20. The apparatus of claim 14, wherein the circuit design is at least one of a design specified at a register transfer level in a hardware description language or a synthesized gate-level netlist.

* * * * *